United States Patent
Poijärvi et al.

(10) Patent No.: US 6,180,078 B1
(45) Date of Patent: Jan. 30, 2001

(54) METHOD FOR THERMALLY REGENERATING SPENT ACID

(75) Inventors: Jaakko Poijärvi, Ulvila; Antti Jalonen, Pori; Johannes Holmi; Jari Ojala, both of Harjavalta, all of (FI)

(73) Assignee: Outokumpu Oyj, Espoo (FI)

(*) Notice: Under 35 U.S.C. 154(b), the term of this patent shall be extended for 0 days.

(21) Appl. No.: 09/197,709

(22) Filed: Nov. 23, 1998

(30) Foreign Application Priority Data

Dec. 9, 1997 (FI) ................................................. 974456

(51) Int. Cl.[7] .......................................................... C01B 17/50
(52) U.S. Cl. ............................................... 423/540; 423/542
(58) Field of Search ....................................... 423/540, 542

(56) References Cited

U.S. PATENT DOCUMENTS

| 3,892,560 | * | 7/1975 | Nermes et al. | 75/23 |
| 4,155,749 | * | 5/1979 | Jaquay | 75/23 |

FOREIGN PATENT DOCUMENTS

| 217268 | * | 11/1956 | (AU) | 423/542 |
| 544488 | * | 8/1957 | (CA) | 423/542 |
| 739483 | * | 11/1953 | (GB) | 423/542 |
| 865782 | * | 9/1981 | (SU) | 423/542 |

OTHER PUBLICATIONS

Kirk–Othmer Encyclopedia of Chemical Technology, 3rd Edition vol. 22; John Wiley & Sons, Inc. U. S. A. ISBN 0–471–02075–3 pp. 199, 200, 206, 207, 209, 210, 211 and 224, 1983.*

* cited by examiner

Primary Examiner—Steven P. Griffin
Assistant Examiner—Timothy C Vanoy
(74) Attorney, Agent, or Firm—Morgan & Finnegan, LLP

(57) ABSTRACT

A process is provided for the thermal decomposition of contaminated sulfuric acid, which was obtained from the scrubbing of sulfur dioxide contaminated gases created in the pyrometallurgical production of metals. The contaminated sulfuric acid is concentrated to obtain a $H_2SO_4$ content of 70% to 80%, wherein, during the concentration step, a portion of the metal components, such as arsenic component, zinc sulfate, cadmium sulfate and copper sulfate, as well as halogens, are removed from the sulfuric acid. The concentrated and purified sulfuric acid is fed into the exhaust shaft of a smelting furnace so that the heat of the smelting furnace exhaust gases thermally decomposes the sulfuric acid into sulfur dioxide, water and oxygen.

7 Claims, 1 Drawing Sheet

METHOD FOR THERMALLY REGENERATING SPENT ACID

Figure 1:
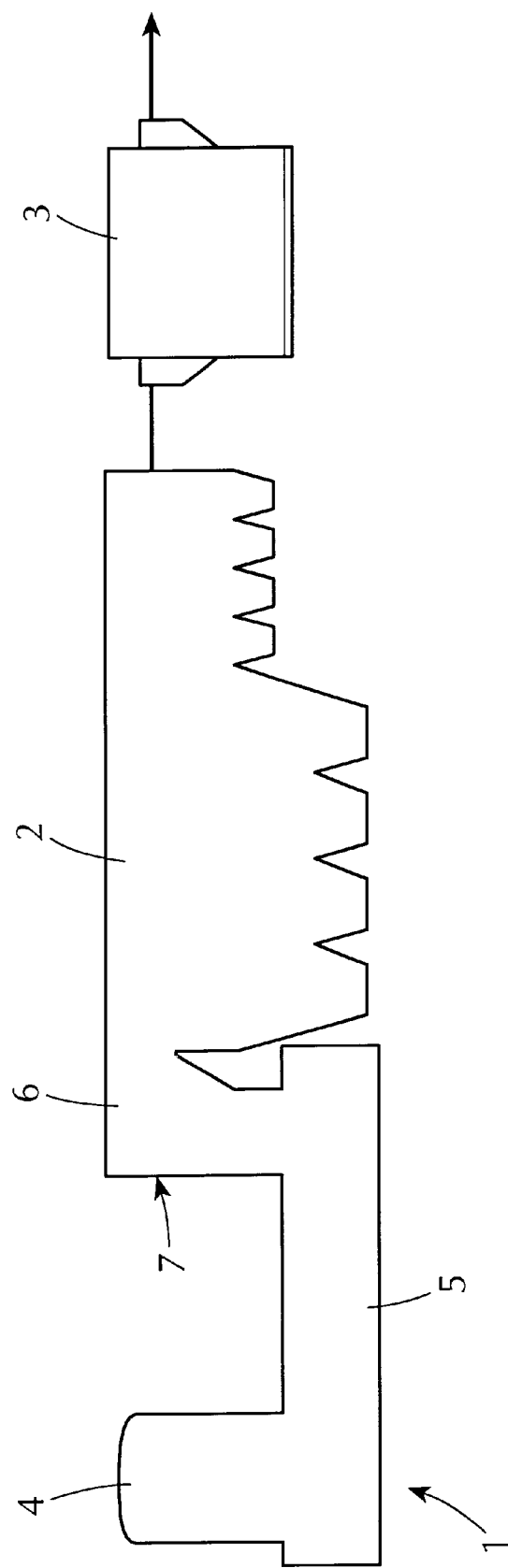

The present invention relates to a method for thermally regenerating spent acid, said spent acid being formed in connection with the scrubbing of sulfur dioxide bearing exhaust gases created in the pyrometallurgical production of metals. According to the method, the spent acid is concentrated and fed into the gas space of a primary smelting furnace, in which case the energy needed in the thermal regeneration of the spent acid is obtained from the heat content of the hot gases created in the smelting process.

The hot gases created in the smelting processes of sulfidic ores and concentrates contain mainly sulfur dioxide, heavy metals, arsenic, halogens and other compounds. It is important that the concentrate burns as completely as possible, and that the oxygen content of the exhaust gases created in the smelting process is as low as possible, because a high oxygen content in the exhaust gases leads to an increased formation of sulfur trioxide and further to the creation of spent acid in connection with the gas scrubbing. It has been found out that dust, particularly copper-bearing dust, catalyses the formation of $SO_3$. Most probably $SO_3$ is created in the waste heat boiler, and in order to prevent this, it is essential that the oxygen content of the exhaust gases is low and that the amount of exhaust air is as small as possible.

The scrubbing of created gases can be divided into dry separation and wet separation. Dry separation methods are realized in connection with a smelter, in which case the gases exhausted from the furnace gas space are generally first conducted into a waste heat boiler, where the gas heat content is recovered. Thereafter the gases are conducted to an electric filter. A remarkable proportion of the heavy metal compounds contained in the gases, excluding quicksilver and its compounds, are separated already in connection with the cooling. The created gas is often conducted to the production of sulfuric acid, and in that case the wet separation of gases takes place in the sulfuric acid plant, in scrubbers, scrubbing towers and wet electric filters.

The purpose of the wet scrubbing of gases is to further cool down said gases to a suitable temperature by means of direct water cooling, and simultaneously to separate from the gases both solid and volatile impurities, such as heavy metals, halogens, arsenic and selenium. In connection with the wet scrubbing, also the $SO_3$ contained in the gases is washed from the gases as spent acid, when it gets into contact with water. The quantity of created spent acid is of the order 2–4% of the amount of sulfur dioxide fed into the wet scrubbing, and its $H_2SO_4$ content is of the order 10–30%.

Spent acid is considered as hazardous waste, because it contains the heavy metals and arsenic of the exhaust gases. If the spent acid cannot be fed into any other process, such as the production of zinc or fertilizers, or into mineral concentration, the spent acid is generally neutralized with lime and conducted to ponds, but spent acid neutralization and gypsum storage are expensive methods for taking care of the spent acid problem. Even this solution is further restricted by new and more stringent demands for environmental protection.

One of the methods employed for treating spent acid is spent acid regeneration in a separate furnace specially built for this purpose. This choice, particularly applied in chemical engineering but also in metallurgical industry, is described in the article "Regenerating Spent Acid", Sander, U., Daradimos, G., Chem. Eng. Prog. (1978), 74, p. 57–67. The article explains that the regeneration of spent acid into sulfur dioxide and water is an extremely endothermic reaction which requires energy at least 275 kJ/mol and works best at temperatures over 1,000° C. The temperature in the regeneration furnace is raised up to a sufficient level by means of some fuel. In the same article, it is also maintained that it is advantageous to concentrate spent acid to a $H_2SO_4$ content of 70% prior to combustion.

According to the present method, the spent acid to be separated from the exhaust gases created in connection with the smelting of sulfidic ores or concentrates is concentrated and fed back into the primary smelting furnace, into the gas space of said furnace, and regenerated there back into sulfur dioxide, water and oxygen according to the following reaction:

$$H_2SO_4 \rightarrow H_2O + \tfrac{1}{2}O_2 + SO_2 \qquad (1)$$

As is seen from this equation, the spent acid is regenerated back into sulfur dioxide, water and oxygen. Now the sulfur dioxide created in the spent acid regeneration is recovered, in addition to the rest of the sulfur dioxide, in order to produce either sulfuric acid or elemental sulfur.

An essential feature of the method is that the spent acid is fed into the gas space of the primary smelting furnace, in which case the high heat content of the gas is made use of. When the spent acid is fed into the gas space, from where the gases are further discharged to a waste heat boiler, the temperature of the gases is high, usually of the order 1,000–1,600° C. The feeding of spent acid to the exhaust gases lowers the gas temperature, and from the point of view of the waste heat boiler, this is profitable because lowered temperature extends the working age of the boiler and reduces the boiler strain. The term primary smelting furnace refers to a furnace whereto the ore or concentrate is fed. For instance in the smelting of copper and nickel concentrate, it is a suspension smelting furnace, such as a flash smelting furnace, a reverberatory furnace or a converter. In the suspension smelting furnace, the spent acid is advantageously fed into an uptake shaft, through which the hot exhaust gases are conducted into the waste heat boiler, but the gases can also be fed to the gas space of the lower furnace, or in exceptional cases even into the reaction shaft. The essential novel features of the invention are apparent from the appended claims.

In general it can be maintained that if the spent acid were fed into the reaction space proper of the smelting furnace, where concentrate and oxygen react, the energy needed in the regeneration of the spent acid should be fed into the furnace separately, because for example the heat content of copper and nickel concentrate is consumed in the reactions between the concentrate and oxygen, and it is not sufficient for regenerating spent acid. In special cases, where the concentrate heat content is high, it is possible to feed concentrated spent acid into the reaction shaft, in which case the degree of oxygen enrichment in the created process gas can be substantially raised. In that case the quantity of gas removed from the suspension smelting furnace is reduced, and the capacity determined in relation to the waste heat boiler and the copper production of the gas scrubbing line is increased.

It has turned out that the feeding of spent acid into the gas space of the primary furnace—the smelting furnace—leads to the advantageous result that the conduit, i.e. the furnace throat, leading from the furnace to the waste heat boiler, is kept cleaner than before, because at a lower temperature the quantity of dust build-ups in the throat remains smaller. It has been experimentally proved that the feeding of spent acid into the gas space lowers the temperature of the gas going into the boiler for an average of 30–100° C. The only drawback caused by the lowered temperature is that the quantity of the vapor created in the waste heat boiler is smaller, i.e. reduced by a quantity corresponding to the temperature decrease, but the advantages achieved by means of said method is manifold compared to said drawback. The feeding of spent acid to the exhaust gases does not increase the quantity of $SO_3$ created in the boiler, because it has been found out that nearly all of the spent acid regenerates at the gas space temperatures.

FIG. 1 illustrates schematically the process in which spent acid obtained during the pyrometallurgical production of metals is converted or regenerated into sulfur dioxide, water, and oxygen in the manner of the invention.

The invention is further described with reference to the appended FIG. 1, where the primary smelting furnace 1 is a suspension smelting furnace, in succession to which there is connected a waste heat boiler 2 and an electric filter 3. The concentrate, the reaction gas and required additional materials are fed into a reaction shaft 4, from where the molten particles drop into a lower furnace 5. The exhaust gases and flue dusts are removed through an uptake shaft to the waste heat boiler. According to the arrangement illustrated in the drawing, the concentrated spent acid is fed, in the direction of the arrow 7, to the gas space of the primary smelting furnace, in this case into the top part of the uptake shaft 6 of the suspension smelting furnace, where it immediately regenerates according to the above described reaction.

As was already pointed out in connection with the description of the prior art, it is advantageous that the spent acid is first concentrated prior to feeding it to the furnace space. The spent acid concentration is generally carried out by first evaporating the acid by means of indirect vacuum evaporation, through which an acid concentration of about 50% $H_2SO_4$ is achieved, and thereafter by means of direct immersion evaporation, through which the desired acid concentration of 70–80% $H_2SO_4$ is achieved. In connection with the concentration, the halogens and arsenic contained in the spent acid are vaporized to the exhaust gases and scrubbed therefrom to the condensates, and heavy metal sulfates (Cu, Zn and Cd) are crystallized out as monohydrates. The spent acid is removed from a sedimentation tank as an overflow over the metal sulfate crystals, in which case the spent acid to be regenerated is for the major part cleared of impurities. The total heavy metal content of the concentrated acid is of the order a few grams per liter, and the halogen content of the order a few tens of milligrams per liter.

The heavy metals and halogens contained in the concentrated spent acid remain in circulation, but they raise the impurity level only slightly in the gases and flue dusts coming to gas scrubbing from the smelting furnace. If the flue dusts are not fed to the smelting furnace but they are treated separately, there is obtained a separate discharge route for heavy metals and arsenic. In other cases the metal sulfate monohydrate crystal mush and its mother solution serve as the discharge route for heavy metals and partly for arsenic, and the evaporation condensates serve as the discharge route for the halogens and the rest of the arsenic. The metal sulfate crystal mush (Cu, Zn, Cd etc.) can be utilized for instance as a raw material in the electrolytic zinc process.

The invention is further described with reference to the appended examples, where the thermal regeneration of spent acid is studied in production-scale test runs both with a copper flash smelting furnace and a nickel flash smelting furnace. However, the method can also be applied in the processes of other metals, for example in the pyrometallurgical zinc process.

EXAMPLE 1

Concentrated spent acid (72% $H_2SO_4$) was fed into the uptake shaft of a copper flash smelting furnace at the spent acid formation rate of the whole smelter, i.e. at about 20 l/min. The spent acid was pumped through an acid-proof nozzle, by utilizing pressure air dispersion, as a fine spray into the uptake shaft of the flash smelting furnace. The acid pressure was 5 bar and the pressure of the sprayed air was 3 bar. The test run lasted 4 h. The feed into the flash smelting furnace was 80 t/h and the exhaust gas flow into the waste heat boiler was about 20,000 $Nm^3/h$. The $SO_3$ content of the gas was measured after the electric filter provided in succession to the boiler. The gas temperature in the boiler sank for about 25° C. The degree of regeneration of $SO_3$ was 90%.

EXAMPLE 2

Similar test arrangements as above were applied to a nickel flash smelting furnace. The test run lasted for 55 hours. The flash smelting furnace feed was 25 t/h, and the exhaust gas flow into the boiler was about 12,000 $Nm^3/h$. The gas temperature in the boiler sank for about 60° C.

The test run results are illustrated in table 2.

| $SO_3$ content, $g/Nm^3$ (average) | | regeneration degree % |
|---|---|---|
| before test | 10 | |
| during test | 10 | 100 |

As is apparent from the test results of the above examples, the $SO_3$ content did not grow substantially during the feeding of spent acid; if the spent acid had not regenerated, it would have lead to a growth of about 50 $g/Nm^3$ in the $SO_3$ content in the exhaust gas flow from the copper flash smelting furnace measured after the electric filter, and to a growth of about 60 $g/Nm_3$ in the $SO_3$ content in the exhaust gas flow from the nickel flash smelting furnace.

From the technical point of view, the feeding of spent acid into the uptake shaft of the flash smelting furnaces was carried out smoothly, and no signs of wearing or corrosion were detected in the nozzle.

What is claimed is:

1. A method for thermally decomposing contaminated sulfuric acid formed from scrubbing sulfur dioxide contaminated gases created in the pyrometallurgical production of metals, wherein the method comprises:

concentrating the contaminated sulfuric acid, wherein a portion of the metal components and halogens are removed out of the sulfuric acid during this concentration step;

feeding the purified and concentrated sulfuric acid into the gas space of the exhaust shaft of a smelting furnace so that the heat of the smelting furnace exhaust gases thermally decomposes the sulfuric acid in to sulfur dioxide, water and oxygen.

2. The method of claim 1, wherein the smelting furnace is a suspension smelting furnace.

3. The method of claim 1, wherein the smelting furnace is a flash smelting furnace.

4. The method of claim 1, wherein the smelting furnace is a reverberatory furnace.

5. The method of claim 1, wherein the smelting furnace is a converter.

6. The method of claim 1, wherein the contaminated sulfuric acid is concentrated to a $H_2SO_4$ content of 70% to 80%.

7. The method of claim 1, wherein the temperature in the smelting furnace is 1,000° C. to 1,600° C.

* * * * *